(No Model.) 2 Sheets—Sheet 1.

C. GATES.
ROLLER MILL.

No. 252,755. Patented Jan. 24, 1882.

WITNESSES
INVENTOR
Charles Gates
By Leggett & Leggett
ATTORNEYS

N. PETERS, Photo-Lithographer, Washington, D. C.

(No Model.) 2 Sheets—Sheet 2.

C. GATES.
ROLLER MILL.

No. 252,755. Patented Jan. 24, 1882.

WITNESSES

INVENTOR
Charles Gates
By Liggitt & Liggitt
ATTORNEYS

UNITED STATES PATENT OFFICE.

CHARLES GATES, OF BROOKLYN, OHIO.

ROLLER-MILL.

SPECIFICATION forming part of Letters Patent No. 252,755, dated January 24, 1882.

Application filed October 8, 1881. (No model.)

*To all whom it may concern:*

Be it known that I, CHARLES GATES, of Brooklyn, in the county of Cuyahoga and State of Ohio, have invented certain new and useful Improvements in Roller-Mills; and I do hereby declare the following to be a full, clear, and exact description of the invention, such as will enable others skilled in the art to which it pertains to make and use it, reference being had to the accompanying drawings, which form part of this specification.

My invention relates to grinding-mills, and more particularly to that class known as "roller-mills;" and it consists in parts and combination of parts, that will be more fully hereinafter described and claimed.

Figure 1:
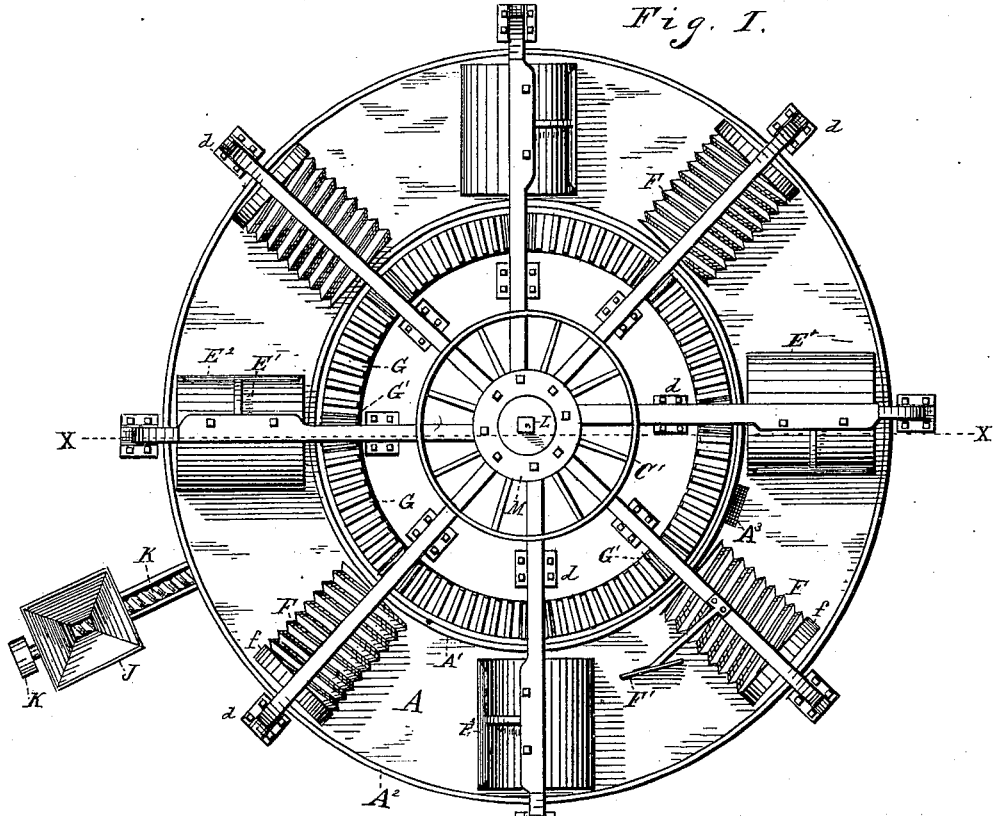
Figure 2:
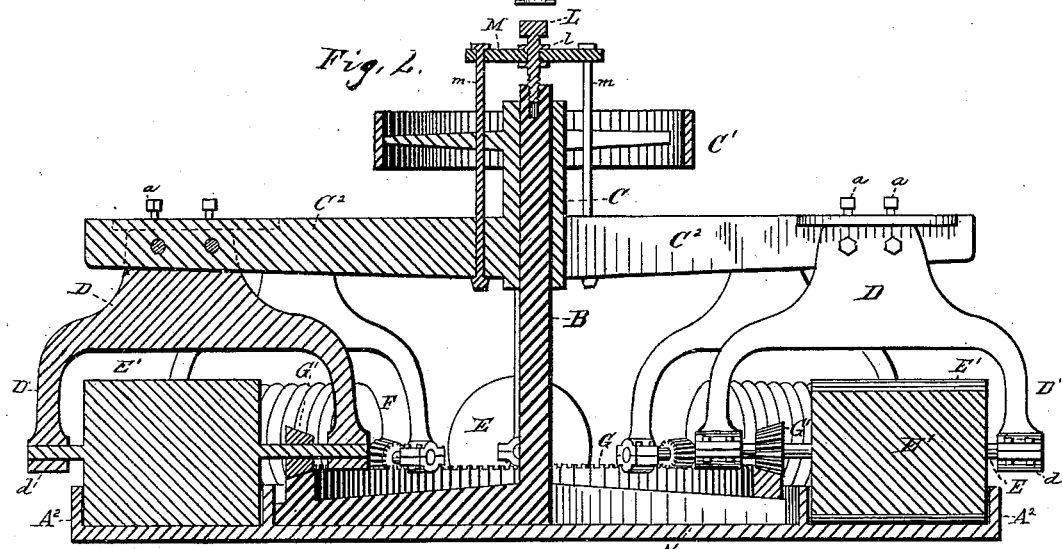
Figure 3:
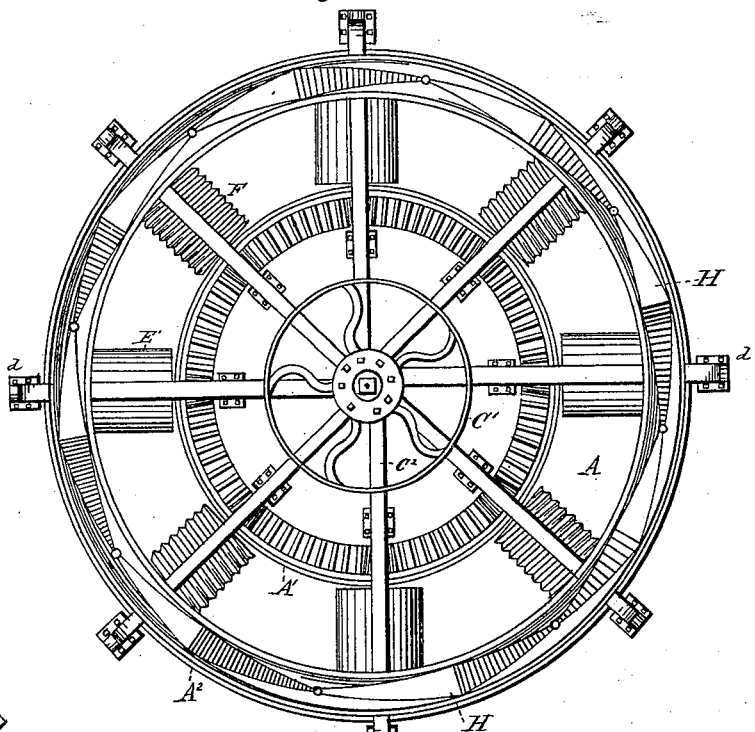
Figure 4:
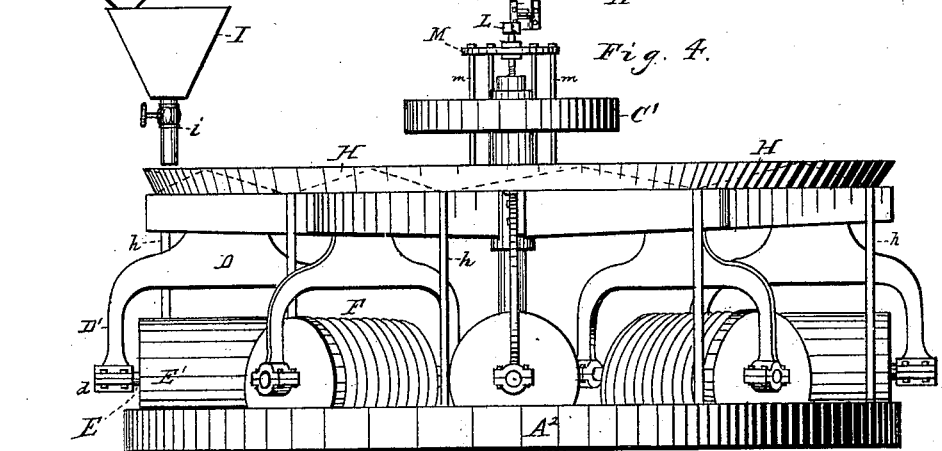

In the drawings, Figure 1 is a plan view of a mill constructed in accordance with my invention with the hoppers removed from the arms, and showing the manner in which the mill may be fed by means of a revolving spiral conveyer. Fig. 2 is a vertical sectional view of the same, taken through the line $xx$ in Fig. 1. Fig. 3 is a plan view with the hoppers attached, and Fig. 4 is a side elevation of the same.

A is a bed-plate, which is constructed of any suitable metal, and formed in the shape of a trough having vertical sides $A'$ $A^2$ and an outlet, $A^3$, for the grain. To this plate, in its center, is a stationary shaft, B, attached and braced by arms extending from the shaft to side $A'$. Upon and around this shaft revolves a sleeve, C, to which are attached a pulley, $C'$, and arms $C^2$. To these arms are attached supporters D, with fingers $D'$, extending therefrom. At the ends of these fingers are boxes $d$, in which revolve shafts E E. Upon this shaft revolve and are supported rolls $E'$ $E'$, of which there are four shown in the drawings. These rolls are adapted to revolve in the trough formed by the sides $A'$ $A^2$, and should be of sufficient length to fill the trough, so that the grain may not escape on the sides. These rolls are true cylinders with perfectly smooth peripheries, and they are preferably composed of the hardest chilled iron, so that they may not be injured by the passage of any foreign substance between them and the plate A.

A scraper, $E^2$, may be attached to the arms $C^2$, extending down to the roll $E'$, to keep the roll clear of such of the grain as may stick to it.

To the sleeve C are also attached revolving spiral conveyers, F in the same manner as are the rolls $E'$. They are made in the form of a screw, with a wheel, $f$, attached to the outer end, which is a trifle larger in circumference than the screw. It rests, and revolves on the plate A, thus keeping the points of the screw from coming in contact with the plate A and cutting it. This conveyer also serves to break up such of the grain as may cake.

There may be a scraper, $F'$, attached to the arms $C^2$, securing one to each arm and placing them so that each one will move the grain a little more toward the side $A'$ than the one passing before it.

Around the shaft B is a crown-gear, G, upon which revolve small pinions $G'$, which are attached to the shaft E E E. This gearing necessitates the continual revolving of the rolls, and is the most important feature of my invention.

To the arms $C^2$ are attached a series of hoppers, H H, with a spout, $h$, passing down from each one at the outer end of the roll $E'$. The spout reaches down to very near the surface of the plate, so that the grain cannot scatter as it falls.

A supplementary hopper, I, is placed over the hoppers H H, with a spout, $i$, attached to it.

A valve may be used in connection with this spout to regulate the feeding of the grain. In Fig. 1 is shown the manner in which the grain may be fed by means of a revolving spiral conveyer. J represents a hopper, from which the grain passes to the spiral conveyer K, which feeds the grain into the side $A^2$, and is operated by means of a pulley, $K'$.

To raise and lower the rolls from surface of the plate, so as to grind the grain as coarse or fine as desirable, there is a large set-screw, L, placed in the top and center of the shaft B. This screw has disks $l$, extending from it, in which and around the screw revolves a plate, M, from which extend bolts $m$ to the arms $C^2$. The ends of the arms $C^2$ have projections over the support D, in which are placed set-screws $a$ $a$, which act to resist the upward pressure of the rolls $E'$.

The operation of my device is as follows: The machine is set in motion through the pulley $C'$, and as it revolves upon the sleeve C and around the shaft B it moves the rolls E' and the revolving spiral conveyers around the plate A. The grain is then allowed to pass from the hopper I, and as the hoppers H pass under it they receive about an equal amount of grain. To these hoppers the movement of the machine gives a vibrating motion, so that the grain passes freely down the spouts $h\ h$, and deposits near the surface of the plate, so that it does not scatter as it falls.

For the purpose of grinding successfully it is necessary that the roll E' should revolve continually. This is accomplished by means of the pinion G', which is secured to the shaft E and revolves on the crown-gear G, thus forcing the roll E' to revolve continually as it passes around the plate A. As the grain is ground it is gradually carried toward the side A' and around the plate A to the outlet $A^3$ by means of the revolving spiral conveyers F, which also act to break up such of the grain as may cake. A scraper may also be attached to the arm $E^2$ for the purpose of passing around the plate.

What I claim is—

1. In a roller-mill, the combination, with a central shaft and a stationary crown-gear, of a series of rolls and pinions and a series of spiral conveyers, said rolls and conveyers being constructed, substantially as described, to receive both a rotary motion on their own axes and a circular motion around the central shaft.

2. In a roller-mill, the combination, with the trough, of a spiral conveyer and a protecting disk or wheel secured to the outer end of the conveyer and of slightly greater circumference than the latter, substantially as set forth.

3. In a roller-mill, the combination, with the conveyer and its supporting-arm, of a scraper secured to said arm, substantially as and for the purpose set forth.

4. In a roller-mill, the combination, with a series of spiral conveyers and rolls, of a series of revolving hoppers, H, and a stationary hopper, I, substantially as set forth.

5. In a roller-mill, the combination, with the central shaft, the rolls, and their operating mechanism, of a plate, M, supported by bolts $m$ and vertically adjustable, substantially as described.

6. The combination, with the central shaft, of the sleeve C and arms $C^2$, the supports D, and the rolls adapted to turn on their own axles, and gearing, substantially as described, for revolving said rolls around the central shaft, substantially as set forth.

In testimony whereof I have signed my name to this specification in the presence of two subscribing witnesses.

CHARLES GATES.

Witnesses:
JNO. CROWELL, Jr.,
HENRY ABELS.